US009972170B2

(12) United States Patent
Hovsepyan

(10) Patent No.: US 9,972,170 B2
(45) Date of Patent: May 15, 2018

(54) VIDEO GAME WITH RANDOMLY GENERATED MULTI COMPONENT ELEMENTS HAVING AT LEAST TWO DEFINING CHARACTERISTICS

(71) Applicant: Zhirayr Hovsepyan, Glendale, CA (US)

(72) Inventor: Zhirayr Hovsepyan, Glendale, CA (US)

(73) Assignee: Zhirayr Hovsepyan, Glendale, CA (US)

( * ) Notice: Subject to any disclaimer, the term of this patent is extended or adjusted under 35 U.S.C. 154(b) by 108 days.

(21) Appl. No.: 14/728,707

(22) Filed: Jun. 2, 2015

(65) Prior Publication Data

US 2016/0358407 A1 Dec. 8, 2016

Related U.S. Application Data

(60) Provisional application No. 62/044,323, filed on Sep. 1, 2014.

(51) Int. Cl.
*A63F 13/00* (2014.01)
*G07F 17/32* (2006.01)
*G07F 17/34* (2006.01)

(52) U.S. Cl.
CPC ........ *G07F 17/326* (2013.01); *G07F 17/3213* (2013.01); *G07F 17/34* (2013.01)

(58) Field of Classification Search
None
See application file for complete search history.

(56) References Cited

U.S. PATENT DOCUMENTS 5,704,835 A * 1/1998 Dietz, II ............. G07F 17/3265 273/143 R
6,120,378 A * 9/2000 Moody ............... G07F 17/3211 273/143 R (Continued)

*Primary Examiner* — Sunit Pandya

(57) ABSTRACT

A method, apparatus and graphic solutions for playing an individual or multi-player game of skill and chance. The gaming system randomly generates and displays a grid of a certain size (2×1, 2×2, 3×1, 3×2, 3×3, 4×1, 4×2, etc.) with a plurality of the multi-component (multi-characteristic) elements. Players are offered to reject or hold elements of the grid not containing certain sign(s), (i.e. symbol, color, figure etc.) in their characteristics and receive randomly generated substitute elements to complete a final combination of grid elements.

While the present invention has various embodiments, the basic principle common to all of the variations is that a grid of multi-characteristic elements comprised of a plurality of signs (i.e. symbols, colors, figures, etc) is shown to a player who is enabled to select a sign(s*) to keep (discard*) the elements comprised of the selected sign(s*) in their characteristics and to discard (keep*) the remaining elements. Random replacement elements are then displayed in the empty spaces of the discarded elements. The player's goal is to match the resulting pattern to previously established winning pattern(s).

*Depends on the mode of a game.

The ranking of each pay line or of the entire grid is determined by comparing the results of the displayed elements to a pay table. The player is then paid in accordance with the pay table and player's wager.

The game, which we shall call BIG JAG, is suitable for land based and online casinos as well as hand-held gadgets, home computers and online servers for casual games.

6 Claims, 5 Drawing Sheets

(56) References Cited

U.S. PATENT DOCUMENTS

| | | | | |
|---|---|---|---|---|
| 7,481,708 | B2 * | 1/2009 | Baerlocher | G07F 17/3244 463/16 |
| 7,625,281 | B2 * | 12/2009 | Bilyeu | G07F 17/32 463/20 |
| 2006/0030395 | A1 * | 2/2006 | Thomas | G07F 17/3293 463/17 |
| 2010/0004048 | A1 * | 1/2010 | Brito | G07F 17/3265 463/20 |

* cited by examiner

| CHARACTERISTIC-A | CHARACTERISTIC-B | CHARACTERISTIC-C |
|---|---|---|
| SIGN 1 YELLOW | SIGN 4 RHOMBUS | SIGN 7 BLACK |
| SIGN 2 ORANGE | SIGN 5 CIRCLE | SIGN8 BLUE |
| SIGN 3 GREEN | SIGN 6 STAR | SIGN 9 RED |
Fig. 3
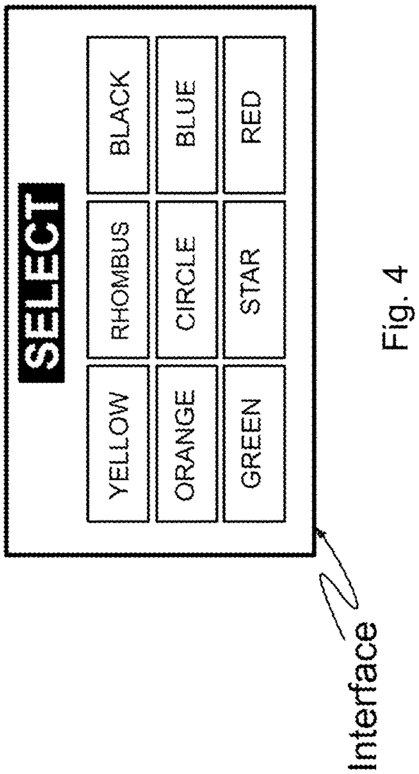
Fig. 4
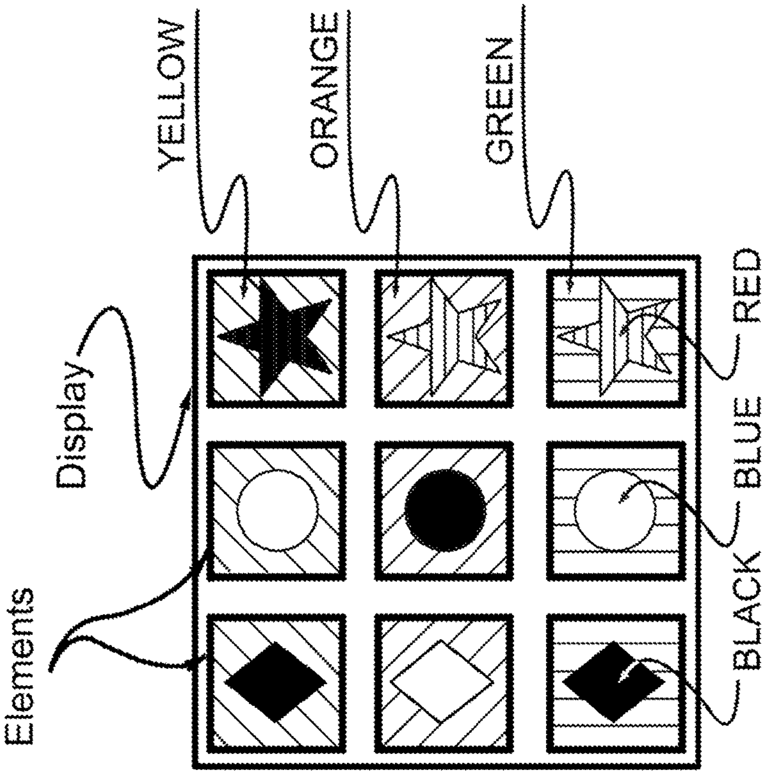
Fig. 2

VIDEO GAME WITH RANDOMLY GENERATED MULTI COMPONENT ELEMENTS HAVING AT LEAST TWO DEFINING CHARACTERISTICS

BACKGROUND

Players have become bored with traditional gaming machines, and operators strive to employ the most entertaining and exciting games available since players continue to seek more entertainment and enjoyment from different types of gaming devices. It is desirable to provide players with new game schemes where the players have an opportunity to receive winning payout and are entertained simultaneously.

It is expected that there are members of the potential gaming public who have had positive experiences with non-card games and who would be attracted to the electronic games which are related to conventional graphics and colors.

The player of the presented game is completely involved in the game. The outcome of the game directly depends on the player's decisions, and at the same time doesn't require any special skills or knowledge. It is kind of a mix of chance and skill games. The rules of this game are extremely simple.

BRIEF DESCRIPTION OF THE INVENTION

According to the present invention, the game is played using elements of a grid having two or more defining characteristics. For example, playing cards have three defining characteristics rank, suit and color. We call them defining characteristics because every card in a deck has its own unique combination of them. These and other characteristics are combined to create innovative modes of play using colors, shapes, figures, letters, numbers, symbols and graphics.

In one embodiment of the present invention, the game is played in a dedicated unit 10 (FIG. 1) with displayed informational and promotional material, which may be shown on screen 18. The actual game is played via player's interface 14 on the video display 12 controlled via a processor, unit 16, that is programmed via computer software.

The game incorporates a specific monitor area to display, for example, a nine-element grid of multi-component elements (FIG. 2).

As it is shown on the table FIG. 3 in this particular case, the grid elements of FIG. 2 have three defining characteristics:

A. Element's base color. B. Figure inscribed in each element shape. C. Color of inscribed figure.

Each characteristic has three possible displays, hereafter called signs (FIG. 3):

A—1. Yellow, 2. Orange, 3. Green. B—4. Rhombus, 5. Circle, 6. Star. C—7. Black, 8. Blue, 9. Red.

Thus there are 9 characteristic signs, which altogether can compose 27 possible implementations of elements.

In the key step of the games offered under the embodiments of the present invention, players would be enabled by using an interface FIG. 4 to select a sign(s), to hold (or discard depending on the game mode) elements comprising the selected sign(s) and to discard (hold) the remaining elements of the grid FIG. 2. After substituting discarded elements with randomly generated new ones, the processor evaluates the resulting pattern of elements with respect to previously established winning patterns.

The games may be conducted with the plurality of elements having a limited or an unlimited number of possible regeneration of identical elements and with or without so called "wild" elements.

BRIEF DESCRIPTION OF THE DRAWINGS

These and other aspects and advantages of the present invention will be described in detail with reference to the accompanying drawings, in which:

FIG. 2 is an exemplary display for a 3×3 grid, a 3 characteristics and 9 signs game embodiment according to the present invention;

FIG. 3 is an exemplary table for a 3 characteristic and 9 sign game embodiment according to the present invention;

FIG. 4 is an exemplary interface for a 3 characteristic and 9 sign game embodiment according to the present invention;

DETAILED DESCRIPTION OF THE INVENTION

The present invention can be implemented in various type of electronic devices, such as: video slot machines, mobile hand-held devices, online servers, home computers etc.

Figure 8:
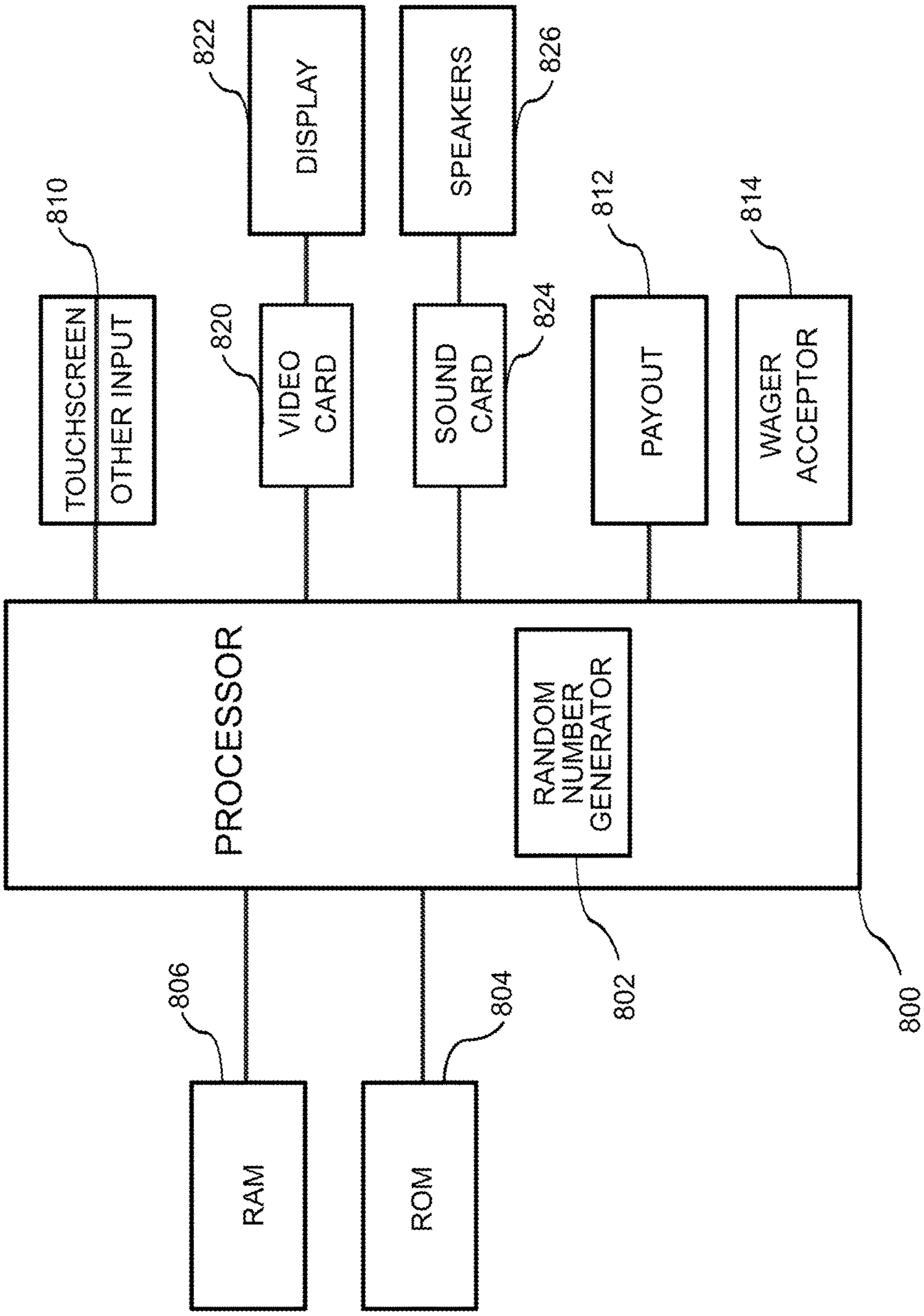
FIG. 8 is a schematic block diagram of the electronic configuration of one embodiment of the gaming device of the present invention.

In FIG. 8, a block diagram of a video game device is shown, on which the present invention may be employed. The video game may comprise virtually any type and/or size of video game including, for example, coin operated video games, hand-held video games, microprocessor or PC driven video games, online or offline mode. The video game device includes a processor unit 800 operably coupled to a ROM/RAM memory units 804 and 806, a graphics display 822 and a plurality of speakers 826. The read only memory (ROM) unit 804 stores control software, operational instructions and data associated with the video game. The memory unit 806 is random access memory (RAM) for storing event data or other data generated or used during a particular game. A random number generator 802 is included for randomly generating elements during play of the game, as described below. The coin-bill management devices 812 and 814 perform a necessary process for managing coins and bills in casino version embodiments of presented invention.

The device controls play of a video game responsive to player inputs provided through an operator interface 810. The operator interface may comprise any combination of push buttons, joysticks, keypads, touch-screens and the like. The game processor 800 executes control software according to the player inputs and communicates the resulting video game play activity to the display 822 and speakers 826.

Figure 1:
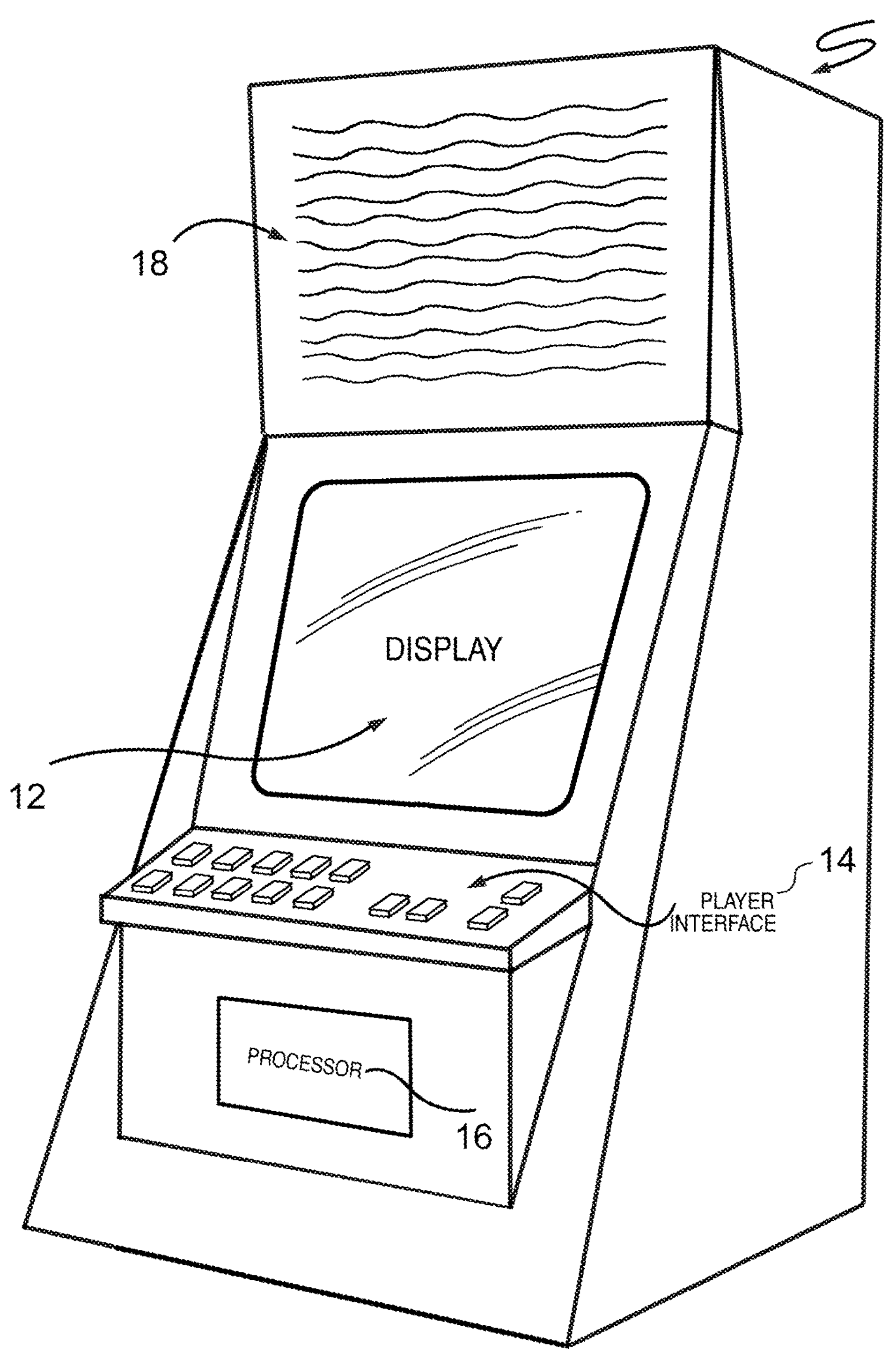
FIG. 1 is a block diagram illustrating the structure effecting game play according to the apparatus of the present invention for the casino slot machine game embodiment.

In the case of casino slot game embodiment FIG. 1 is a schematic illustration showing the components of a video game unit 10 configured or programmed with software for playing the game according to the invention. The software and programming of the game unit for carrying out the games according to the invention do not form part of the present invention and will thus not be further described. Those of ordinary skill in the art will contemplate various known means for such software and programming, and the invention is not meant to be limited to any particular means.

The game unit 10 (FIG. 1) includes a display 12, a player's interface 14, and processing unit 16 which includes a structure for generating random elements according to the present invention, thus effecting game play. The processing circuit 16 effects game play according to the rules of the game and resolves wagers based on resulting patterns and a comparison with established winning patterns.

Figure 7:
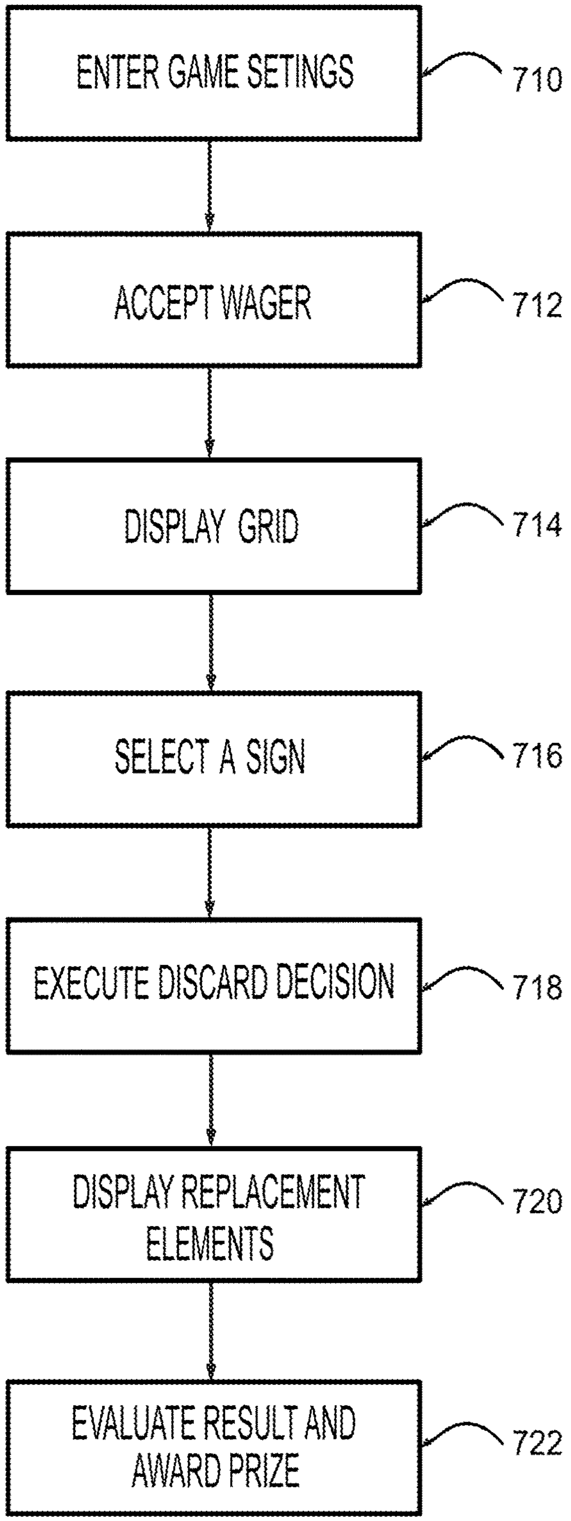
FIG. 7 is a flow chart depicting the steps in a gaming process according to an embodiment of the present invention for a casino slot machine.

The method of playing a game on video slot machine includes the following steps (FIG. 7):

(a) establishing at least one winning pattern of a plurality of elements, wherein each of the elements includes at least two defining characteristics that comprising at least two signs and being independently characteristic of each of the elements 710, (b) enabling a player to select a mode of play 710, (c) receiving a wager from a player that the winning pattern will occur 712, (d) randomly generating a pattern of a grid elements 714, (e) enabling a player to select a sign(s) 716, (f) discarding elements that do not comprise (or comprise, depending on the mode of the game) the selected sign(s) 718, (g) randomly generating a plurality of the new elements to substitute discarded ones 720, (h) if the resulting pattern matches a winning pattern, paying a payout based on the wager and pay table 722.

In special cases, elements may include playing cards, wherein step (b) is practiced by establishing the winning pattern with the playing cards according to a card game's winning combinations, such as in poker, blackjack or any other game.

Figure 5A:
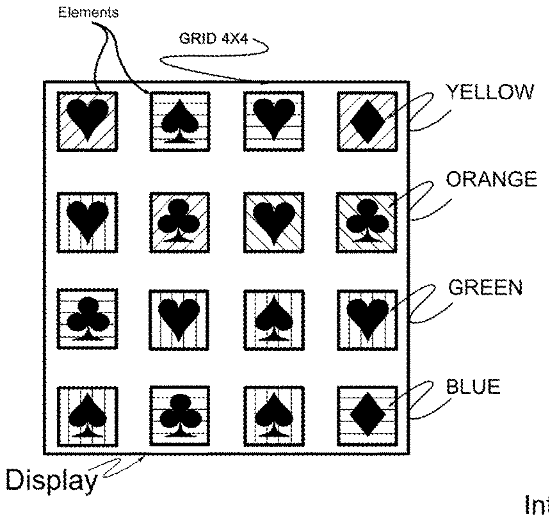
FIG. 5A, FIG. 5B and FIG. 5C are exemplary displays for a 4×4 grid, a 2 characteristic and 8 sign game embodiment according to the present invention.
Figure 6:
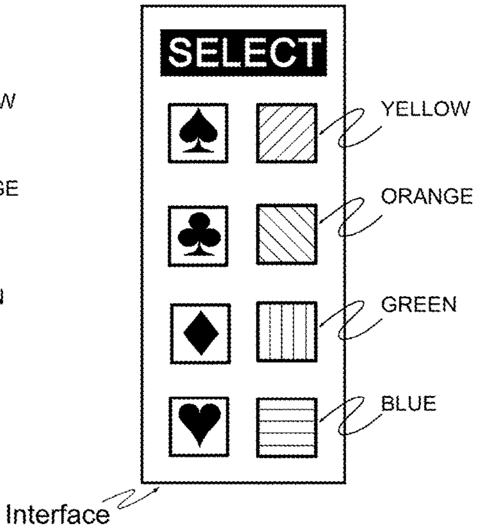
FIG. 6 is an exemplary interface for a 2 characteristic and 8 sign game embodiment according to the present invention.

The concepts and playing modes according to the invention will be described in conjunction with an application to a symbol representation of conventional card suits. As shown in FIG. 5A and FIG. 6, the elements are comprised of four suits of conventional cards, shown as figure inscribed in a square shaped element. Each element is preferably also colored, and four different colors are provided. Thus there are two defining characteristics (grid element's color and inscribed figure) and so 8 characteristic signs (4 suits and 4 colors) that are represented on player's interface (FIG. 6), These signs altogether compose 16 possible appearances of elements.

The card symbol representation in the following examples is exemplary, and those of ordinary skill in the art will contemplate variations of core features according to the invention with or without the card representations. The description is thus for exemplary purposes, and the invention is not meant to be limited to the described application.

Upon commencing a game, play credits are established by a player by any suitable method including either coin or bill insertion or player card methodology via the player interface 14 (FIG. 1).

The processor 16 (FIG. 1) establishes at least one winning pattern of the grid and drives the display 12 (FIG. 1) to display a matrix of elements, such as the 4×4 grid of elements illustrated in FIG. 5A. Once a playing mode is established, the player activates the game via the player interface 14 (FIG. 1), and the display simulates a card "roll" through a random number generation sequence of the appropriate number of, sixteen in this example, different possibilities of elements until stopping at a randomly generated resulting pattern FIG. 5A. In this phase, on the interface (FIG. 6) selecting sign buttons become highlighted, thus enabling the player to select a sign (any color or any suit (FIG. 6) by using known touch screen or hold button methodology to hold elements comprising (or not comprising depending on the game mode) the selected sign and "roll" the rest of elements as a method of adding to the retained elements and improving the grid ranking, according to the winning patterns. If the resulting pattern of the grid (FIG. 5C) matches one of the winning patterns, the player is awarded credits according to the wager and payout schedules for the selected game.

Figure 5B:
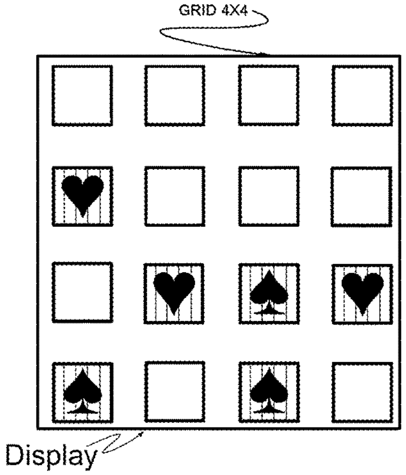
Figure 5C:
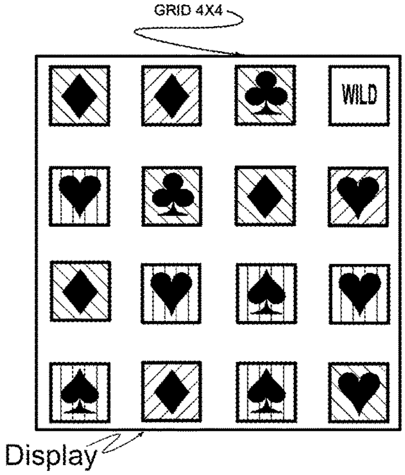

Said player selects to hold the "green" sign (FIG. 6), then after discarding the elements not comprising the green color, the grid of elements is going to have the appearance in FIG. 5B. After randomly generating new elements and substituting the discarded ones, one of the possible grid appearances can be the grid shown in FIG. 5C. If this pattern matches one of the winning patterns, the player is awarded credits.

Although the above represented plurality of element configurations can be used in at least one embodiment of the present invention, those of skill in the art will understand how to select other potential pluralities of elements useable with other embodiments of the present invention (including configurations having more, fewer or unlimited elements, having more or fewer wild symbols) after understanding the present disclosure.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and/or reducing cost of implementation. The present invention includes items which are novel, and terminology adapted from previous and/or analogous technologies, for convenience in describing novel items or processes, do not necessarily retain all aspects of conventional usage of such terminology.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A computer-implemented gaming method for casino gaming involving a single player, comprising:

(a) defining a grid of at least two multi-characteristic elements;

(b) establishing at least one winning pattern of a plurality of elements, wherein each of the elements includes at least two defining characteristics that comprising at least two signs and being independently characteristic of each of the elements;

(c) enabling a player to set a mode of game play;

(d) receiving a wager from a player that the winning pattern will occur;

(e) randomly generating a pattern of the grid elements;

(f) enabling a player to select signs;

(g) discarding elements that either comprise or do not comprise the selected signs, depending on the game mode selected;

(h) randomly generating a plurality of new elements to substitute for the discarded elements, and (i) paying a payout based on the wager and pay table, if the resulting pattern matches the winning pattern.

2. A method according to claim 1, wherein the elements comprise playing cards, and wherein step (b) is practiced by establishing the winning pattern with the playing cards according to poker-style combinations.

3. A method according to claim 1, wherein the elements comprising at least one characteristic of: a color consisting of (a) black, (b) gray, (c) white, (d) brown, (d) red, (e) orange, (f) yellow, (g) green, (h) blue, (i) Indigo, and (j) violet, or an inscribed shape consisting of: circle, square, triangle, rectangle, pentagon, hexagon, five-pointed star, six-pointed star or multi-pointed star, or a numerical representation consisting of: 0, 1, 2, 3, 4, 5, 6, 7, 8, 9, or a font consisting of: Latin alphabet letter, or a conventional symbol consisting of: zodiac symbols, eternity symbol, peace sign etc.

4. A gaming apparatus for casino gaming involving a player, enabling:

generating a grid of elements;

establishing at least one winning pattern of a plurality of elements, wherein each of the elements includes at least two defining characteristics including at least two signs and being independent characteristic of each of the elements;

enabling the player to select a game mode of play;

receiving a wager from the player that the winning pattern will occur;

a random number generator that randomly generates a pattern of the elements;

enabling the player to select a signs to discard elements that either comprise or do not comprise the selected signs, depending on the game mode selected;

the random number generator randomly generating substitute elements;

providing a payout based on the wager and pay table if the resulting pattern matches the winning pattern.

5. The gaming apparatus of claim 4, in which such game controller is selected from the group consisting of:

a) electronic video game machines;

b) mechanical game machines;

c) computers; and d) hand-held video devices.

6. A computer implemented game for casino gaming involving a single player comprising:

means for defining a grid of elements;

means for establishing at least one winning pattern of grid with plurality of elements, wherein each of the elements includes at least two defining characteristics, the defining characteristics being independent characteristic of each of the elements;

means for enabling a player to select a mode of play;

means for receiving a wager from a player that the winning pattern will occur;

means for randomly generating a pattern of the elements;

means for enabling a player to select a signs;

means for discarding elements that either comprise or do not comprise of the selected signs, depending on the game mode selected;

means for randomly generating a plurality of new elements to substitute for the discarded elements;

means for paying a payout based on the wager and pay table if the resulting pattern matches the winning pattern.

* * * * *